Patented Apr. 8, 1947

2,418,458

UNITED STATES PATENT OFFICE 2,418,458

PEST CONTROL

Euclid W. Bousquet, Wilmington, Del., assignor to E. I. du Pont de Nemours & Company, Wilmington, Del., a corporation of Delaware No Drawing. Application June 12, 1943,
Serial No. 490,640

17 Claims. (Cl. 167—33)

This invention relates to pest control and is particularly directed to methods and compositions for preventing or arresting infestations of insects and other pestiferous organisms, whether plant or animal, such as fungi, bacteria, protozoa, molds and worms, which are economically harmful to man and which commonly infest organic matter, whether plant or animal or of plant or animal origin, either in its natural, fabricated or synthetic state, which compositions distinguish from the processes and compositions known heretofore in the use of a bi-molecular condensate of a keto-enol and a phenol having a replaceable ortho hydrogen.

The need for and the desirability of having a truly synthetic organic pest control agent has long been recognized in the art and much research has been carried out for the purpose of discovering such agents. That such research has been only partially effective in accomplishing its object is amply illustrated in the present emergency by our dependency upon imported materials such as rotenone products.

I have now found that control of noxious pests can be obtained by bringing into contact with the pests a toxic amount of a product of a bi-molecular condensate of a keto-enol and a phenol having a replaceable ortho hydrogen.

When applied in a proper manner and in suitable composition these condensation products are effective for the control of a wide variety of pests and some of them are comparable in toxicity to rotenone and other rotenone-like properties. These products, however, have much better solubilities in hydrocarbon solvents than rotenone. They are likewise very soluble in polar solvents such as acetone, alcohol, ethyl acetate, etc.; also in vegetable oils and animal oils, kerosene, naphtha, etc. Thus their range of commercial applications from this property alone is substantially increased over rotenone.

The compounds according to the invention may be prepared simply by bringing together the two components, namely, the phenol and the ketone, in the presence of a suitable catalyst such as hydrogen chloride. The condensation is believed to take place in such a manner as first to unite one mol of ketone with one mol of phenol with the loss of a mol of water and then to unite two mols of this product making, in effect, the condensation product of two mols of the phenol with two mols of the ketone. The product may be termed a dimeride. Alternatively the reaction may take place thru a self-condensation product of a ketone such as diacetone alcohol and mesityl oxide with two mols of the phenol. The ketone should be one which is potentially capable of existence in tautometric equilibrium with its enolic form. These ketones are therefore properly keto-enols.

The precise mechanism by which the phenol and ketone condense is not understood and it is quite possible that, depending upon the ketone and phenol, products of somewhat different structure may be obtained. According to Baker and co-workers, Journal of the Chemical Society (1940), page 1103, the condensation may proceed in such a manner as to give a 2'-hydroxyflavan structure, altho they did not confirm this by an independent unambiguous synthesis. This much, however, is known: (1) that the products are bi-molecular in the sense that two mols of phenol and two mols of ketone enter into the condensation product, (2) that two mols of water are lost in the condensation, and (3) that they are characterized by one hydroxyl group which may be esterified and which has such weak phenolic properties as led Baker and co-workers to characterize it as cryptophenolic.

The products are not to be confused with such well-known products as diphenylol propane obtained by condensing two mols of phenol with only one mol of acetone with the loss of only one molecule of water.

The condensation product of acetone and metacresol as represented by Baker and co-workers is the compound 2'-hydroxy-2,4,4,7,4'- pentamethylflavan which has the following structure:

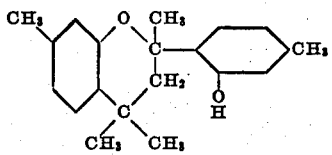

By using methods substantially as outlined above a wide variety of products may be obtained. Thus highly desirable products may be obtained by condensing alpha-methylene ketones and methyl ketones preferably of the aliphatic (including cycloaliphatic) series with a phenol having a replaceable hydrogen in the ortho position and preferably having a substituent in the meta position.

As illustrating suitable methods of preparation of typical compounds reference may be had to the following examples in which the parts are by weight unless otherwise specified.

*Example 1*

A mixture of 648 g. of commercial meta-cresol (98-100%) and 232 g. of acetone was cooled to 0° C. and saturated with 75 g. of gaseous hydrochloric acid. After standing at room temperature from 1 to 3 days a water layer on the bottom of the reaction mixture had formed amounting to 92 cc. (110.5 g.). The product was washed several times with water by decantation and followed by washing of a benzene solution of the product with water until the washings were only slightly acid to litmus. The benzene solution was then vacuum distilled and the benzene, water and excess cresol were removed. Two hundred fifty-four and five-tenths grams of cresol were recovered and the crude product amounted to 525 g. of an orange-yellow resinous material.

This crude material is satisfactory for insecticidal purposes as an examinattion of subsequent insecticidal data will show. Further purification, however, may be accomplished by distillation and a pure fraction amounting to 85-90% of the crude product may be obtained which boils at 187-190° C./2 mm. This material on analysis is shown to have a molecular weight of 292 as compared to 296 for the calculated value of the bi-molecular condensate. A determination of hydroxyl number gives a value of 185.8 as compared to a calculated value of 182.4. The product is a light yellow thermoplastic sticky resinous material. A colorless material may be obtained by the procedure described in Example 2.

Variations of the procedure in Example 1 in connection with excess of reagents, temperature, catalyst, and method of purification may be employed to obtain the same product. The HCl catalyst may be introduced into the mixture of acetone and cresol at ordinary room temperature. The velocity of reaction increases as the temperature reaches the neighborhood of 40-50° C.

Likewise in place of acetone in the above reaction of Example 1, diacetone alcohol and mesityl oxide may be substituted in the proper mol proportions.

*Example 2*

One hundred grams of the product from Example 1 boiling at 187-190° C./2 mm. is dissolved in a hydrocarbon solvent such as petroleum ether (100 cc.) and to this warm solution is added 40-100 cc. of diethyl ether. The solution is then cooled and a solid precipitate comes out which on filtration and washing with cold ether results in a white crystalline product amounting to about 85% of the theoretical. The product melts at 71-73° C. altho some softening is evidenced at 68° C.

The bi-molecular condensate may be regenerated from this solvate or etherate by simply heating at around 100° C. to remove the ether of crystallization. The resulting product is a colorless, gummy material of the same nature as previously described. The etherate above described on analysis gives values of 78.27% for carbon and 8.64% for hydrogen which corresponds within experimental error to the calculated value for the solvate of the dimeride containing one molecule of ether of crystallization.

*Example 3*

A solution of 59 g. of the product from Example 1 (B. P. 187-190° C./2 mm.) in 150 cc. of dioxan, 20 cc. of water and 15 g. of sodium hydroxide was heated to 60° C. and to this solution was slowly added, in portions, 40 g. of dimethyl sulfate keeping the solution on the alkaline side by addition of more aqueous alkali if necessary. The product was heated for one hour after mixture of the above reagents on the steam bath. The reaction mixture was treated with water to separate an oily layer and the oily layer which separated was washed with alkali and water until neutral and relieved of its solvent by distillation. The product remaining was recrystallized from methyl alcohol giving 41 g. of white crystals melting at 90-92° C. Analysis showed a carbon content of 81.30% and a hydrogen content of 8.39% which compares within experimental error for the calculated value of the methyl ether of 2'-hydroxy-2,4,4,7,4'-pentamethylflavan.

*Example 4*

The acetate of the flavan of Example 1 was prepared by heating a mixture of 30 g. of the flavan with 100 cc. of acetic anhydride and 5g. of sodium acetate at reflux for 4 hours. The crude product isolated therefrom and recrystallized from ethyl alcohol melted at 100-102% C.

*Example 5*

A solution of 49 g. of mesityl oxide and 120 g. of meta-cresol is saturated with hydrochloric acid gas at 0° C. until 20 g. of HCl has been absorbed. The material is then allowed to stand at room temperature for six days after which it is purified by first scrubbing with water until practically neutral to litmus and then distillation of this scrubbed product. In this way a fraction boiling at 181-187° C./2 mm. is obtained.

*Example 6*

Similarly a mixture of 120 g. of meta-cresol (98-100%) and 58 g. of diacetone alcohol when saturated at 0° C. with 27 g. of hydrochloric acid gas and allowed to stand at room temperature for 3 days gives a like product.

Example 7

A mixture of 240 g. of pure p-cresol and 116 g. of acetone is saturated with 35 g. of gaseous HCl at 0° C. and the mixture is allowed to stand at room temperature for 5 days. Purification in accordance with the procedure of the previous examples results in a fraction boiling at 175–190° C./2 mm. which at room temperature possesses the same physical characteristics as those of the compound prepared from the pure meta-cresol although differing somewhat in odor. This product from the p-cresol has a rather pleasant odor.

Either the crude product or the distilled fraction may be used for insecticidal applications.

Example 8

A mixture of 540 g. of cresol (a commercial fraction consisting of approximately 53% meta-cresol and 47% p-cresol; boiling range between 199–205° C.) and 232 g. of acetone is saturated at 0° C. with 69 g. of hydrochloric acid gas. After standing at room temperature for 3 days this material is purified in accordance with the method used in the previous example 1 and a crude product amounting to 411 g. is thereby produced. This product has a molecular weight of 287 and is entirely satisfactory for insecticidal purposes.

By procedures akin to those outlined in the preceding examples a wide variety of products may be obtained by substituting appropriate phenols, such as phenol, cresols, xylenols and other alkylated, arylated and halogenated phenols including the monoalkyl ethers of dihydric phenols, such as the monomethyl ether of resorcinol, m-chlorophenol, 2,4 - dichlorophenol, p - chlorophenol, p - bromophenol, naphthols, m-hydroxydiphenyl, and suitable ketones such as acetone, methylethyl ketone, diethyl ketones, cyclohexanone, cyclopentanone, the methyl ester of levulinic acid, etc. With meta-cresol the methylethyl ketone behaves very similar to acetone and gives a product of similar properties altho of slightly higher boiling point as compared with the product obtained from acetone. The cyclohexanone derivative is obtained in a similar manner and is practically colorless altho somewhat more thermoplastic than the meta-cresol acetone derivative. Cyclopentanone gives a very brittle, slightly fluorescent resinous material and reacts somewhat more vigorously than acetone. Both the diethyl ketone and the methyl ester of levulinic acid react rather slowly in the process. Nevertheless they yield well defined products.

The products are readily chlorinated or nitrated by the usual methods. Chlorine reacts vigorously under chlorination with 2'-hydroxy-2,4,4,-7,4'-pentamethylflavan to give chlorinated products. Under controlled conditions varying amounts of chlorine can be introduced into these flavan-like materials. For example, a tetrachlorinated derivative melting at 140–141° C. was obtained by chlorination of the above flavan in carbon tetrachloride solvent.

The conditions under which the above condensation between the various ketones and phenolic materials takes place may be varied considerably with satisfactory results. For example, the time of reaction may be appreciably diminished by starting the reaction at higher initial temperatures. Likewise aqueous hydrochloric acid may be substituted in place of the gaseous reagent altho somewhat superior results have been obtained with the anhydrous product. Thus by suitable choice of conditions and reagents a wide variety of products suitable for insect control are obtained.

I am aware that U. S. Patents 2,217,879, 2,291,-192, 2,291,193, 2,291,194 and 1,995,247 and British Patent 528,753 disclose compounds containing a 6-membered oxyheterocyclic ring such as the 2,4-dioxochromans, the xanthanes, xanthydrols, the xanthones and the coumarins. These compounds, however, are quite unlike the condensates above described and none has attained any commercial significance. Moreover, there has been no indication as yet that any of these compounds have rotenone-like properties or would be useful as a rotenone substitute.

My invention may be more fully understood by reference to the following examples in which the parts are by weight unless otherwise specified:

Example 9

A solution of 1 part of 2'-hydroxy-2,4,4,7,4'-pentamethylflavan dissolved in 100 volume-parts of acetone was thoroly mixed with 99 parts of talc to form a paste. The acetone was then evaporated and the product comminuted to form a dust. There is thus obtained a product suitable for dusting bean foliage for the control of Mexican bean beetle.

The proportions may be varied to give dust compositions containing greater or less of the active ingredient of the 1% dust may be diluted with talc simply by admixture therewith to provide more dilute dust.

In place of the 2'-hydroxy-2,4,4,7,4'-pentamethylflavan there may be substituted the ether of crystallization of 2'-hydroxy-2,4,4,7,4'-pentamethylflavan with substantially the same effectiveness notwithstanding the dilution effect of one mol of ether of crystallation, or there may be substituted 2'-acetoxy-2,4,4,7,4'-pentamethylflavan with substantially the same result. There also may be substituted 2'-hydroxy-2,4,4,6,5'-pentamethylflavan (condensate of para-cresol and acetone) or a mixture of this product with 2'-hydroxy-2,4,4,7,4'-pentamethylflavan obtained by condensing acetone with a crude mixture of m- and p-cresols. There also may be substituted the condensate of xylenol and acetone of mesityl oxide and phenol (2'-hydroxy-2,4,4-trimethylflavan), of the monomethyl ether of resorcinol and acetone (2'-hydroxy-2,4,4-trimethyl-4',6-dimethoxyflavan), of diacetone alcohol and m-cresol, of ethylmethyl ketone and m-cresol, of cyclohexanone and m-cresol, of cyclopentanone and m-cresol, and the methyl ester of levulinic acid and m-cresol. There may also be substituted the nitrated of chlorinated 2'-hydroxy-2,4,4,7,4'-pentamethylflavan.

Example 10

25 parts of 2'-hydroxy-2,4,4,7,4'-pentamethylflavan and 1 part of lauryl alcohol (technical n-dodecyl alcohol) is disolved in 100 volume-parts of acetone. This solution is thoroly mixed with 74 parts of Celite and dried and comminuted to give a product dispersible in water for application as a spray.

In place of the 2'-hydroxy-2,4,4,7,4'-pentamethylflavan there may be substituted other active agents, as in Example 9.

Example 11

2'-hydroxy-2,4,4,7,4'-pentamethylflavan was dissolved in acetone to a concentration of 2.5% and 0.25% of a wetting agent known to the trade as IN-438 the active agent of which is the sodium salt of sulfated oleyl acetate. This composition is suitable for dispersing in water to provide a contact insecticide spray for the control of such pests as red spider.

In place of the 2'-hydroxy-2,4,4,7,4'-pentamethylflavan there may be substituted the other active agents of Example 9.

The foregoing is illustrative of typical compositions. It will be understood, however, that numerous other types of compositions come within the scope of the invention and that variations in the type of compositions illustrated are also within the scope of the invention; and that the compounds of the invention may be incorporated in various compositions according to the requirements of control of the particular pest involved. They should be incorporated in such compositions in a fine state of dispersion in a suitable carrier which may be a liquid or a finely divided solid. The dispersed particles should be less than 40 microns in size. If the carrier is an inert solid, particles of the carrier also should be less than 40 microns. The dispersion may be either a molecular dispersion, a micellar dispersion, or a physical dispersion. In the first of these the particles will be dispersed as molecules or ions, in the second as groups of molecules and in the third as discrete particles. There may be incorporated in these compositions, either in the form sold or in the form made up for application, various auxiliary materials such as spreaders, stickers, dispersing agents, flocculating agents and conditioning agents as more particularly set out below.

It is also to be understood that the concentrations may be varied according to the exigencies of the particular circumstances and according to the requirements of any particular compound. For instance, in Example 9 with 2'-hydroxy-2,4,4,6,5'-pentathylflavan a concentration of at least ten times as great as with 2'-hydroxy-2,4,4,7,4'-pentamethylflavan is required to effect a suitable degree of control of Mexican bean beetle. Other compounds may even require higher concentrations. Yet this does not detract from the effectiveness of such compounds in view of the extreme toxicity of the 2'-hydroxy-2,4,4,7,4'-pentamethylflavan.

The relative effectiveness of some of the products of the invention is illustrated in the following tables. In Table I the product was compounded according to Example 9 and applied to bean foliage which was thereafter infested with Mexican bean beetle larvae. The tests were taken in comparison with such standing control insecticides as calcium arsenate and derris.

*Table I.—Mexican bean beetle larvae*

| Ketone-Phenol Condensate (Flavan) | | | | Control | | | |
|---|---|---|---|---|---|---|---|
| Compound | Conc. | Kill | Defoliation | Compound | Conc. | Kill | Defoliation |
| | Per cent | Per cent | Per cent | | Per cent | Per cent | Per cent |
| 2'-hydroxy-2,4,4,7,4'-pentamethylflavan (m-cresol + acetone) | 1.0 | 100 | 2 | Calcium arsenate | 1.0 | 100 | 5 |
| | 0.5 | 100 | 0 | | 0.5 | 27 | 20 |
| | 0.25 | 100 | 2 | | 0.25 | 43 | 15 |
| | 0.1 | 100 | 2 | | 0.1 | 14 | 75 |
| | 0.1 | 100 | 1 | Derris (5.0% rotenone) | [1]0.1 | 90 | 0 |
| Ether adduct of 2'-hydroxy-2,4,4,7,4'-pentamethylflavan | 0.5 | 100 | 3 | | 0.5 | 80 | 15 |
| | 0.25 | 100 | 1 | Calcium arsenate | 0.25 | 27 | 25 |
| | 0.1 | 100 | 5 | | 0.25 | 27 | 25 |
| 2'-acetoxy-2,4,4,7,4'-pentamethylflavan (acetic ester of m-cresol-acetone condensate) | 1.0 | 93 | 5 | | 1.0 | 93 | 3 |
| | 0.5 | 100 | 1 | Do | 0.5 | 90 | 3 |
| | 0.25 | 100 | 5 | | 0.25 | 43 | 15 |
| | 0.1 | 93 | 5 | | 0.1 | 14 | 75 |
| 2'-hydroxy-2,4,4,6,5'-pentathylflavan (p-cresol-acetone condensate) | 1.0 | 77 | 6 | Do | 1.0 | 97 | 3 |
| 2'-hydroxy-2,4,4-trimethyl-4',6-dimethoxyflavan (m-methoxyphenol-acetone) | 5.0 | 93 | 10 | | 5.0 | 100 | 1 |
| | 2.5 | 80 | 5 | | 2.5 | 100 | 2 |
| | 1.0 | 86 | 15 | | 1.0 | 90 | 2 |
| Condensate of diacetone alcohol and m-cresol | 1.0 | 100 | 2 | Do | 1.0 | 97 | 3 |
| | 0.5 | 97 | Trace | | 1.0 | 97 | 3 |
| | 0.25 | 73 | 25 | | 0.25 | 26 | 60 |
| | 0.1 | 30 | 80 | | 1.0 | 97 | 3 |
| Condensate of acetone and crude mixture of m- and p-cresols: | | | | | | | |
| A. Crude | 1.0 | 100 | 0 | | 1.0 | 100 | 3 |
| | 0.5 | 100 | 1 | Do | 1.0 | 100 | 3 |
| | 0.25 | 100 | 2 | | 0.25 | 17 | 15 |
| | 0.1 | 63 | 35 | | 1.0 | 97 | 3 |
| | 0.1 | 63 | 35 | Derris (5% rotenone) | [1]0.1 | 90 | 0 |
| B. Distilled | 1.0 | 100 | 0 | | 1.0 | 100 | 3 |
| | 0.5 | 100 | 2 | Calcium arsenate | 1.0 | 97 | 3 |
| | 0.25 | 100 | 5 | | 0.25 | 17 | 15 |
| | 0.1 | 43 | 25 | | 0.25 | 17 | 15 |
| 2'-methoxy-2,4,4,7,4'-pentamethylflavan (methyl ether of m-cresol-acetone condensate) | 5.0 | 87 | 20 | | 5.0 | 100 | 1 |
| | 2.5 | 70 | 45 | Do | 2.5 | 100 | 2 |
| | 1.0 | 70 | 60 | | 1.0 | 90 | 2 |
| Condensate of low boiling xylenol and acetone | 5.0 | 97 | 5 | | 5.0 | 100 | 1 |
| | 2.5 | 100 | 5 | Do | 2.5 | 100 | 2 |
| | 1.0 | 90 | 8 | | 1.0 | 90 | 2 |

[1] Contains 0.1% of rotenone plus up to 0.3% total extractives.

Table II illustrates contact properties with respect to red spiders (*Tetranychus telarius*) and *Aphis rumicis*. The compositions were prepared according to Example 9 and sprayed on foliage infested with the pest. Comparison was made with such standard insecticides as Lorol rhodanate (technical n-dodecyl thiocyanate) and rotenone.

*Table II.—Contact insecticides (red spiders and Aphis rumicis)*

| Ketone-Phenol Condensate (Flavan) | | | | | Control | | | |
| --- | --- | --- | --- | --- | --- | --- | --- | --- |
| Compound | Wetting Agent Conc. | Concentration | Dead Red Spider | Dead Aphis rumicis | Compound | Concentration | Dead Red Spider | Dead Aphis rumicis |
| 2'-hydroxy-2,4,4,7,4'-pentamethylflavan (m-cresol-acetone): | | | Per cent | Per cent | | | Per cent | Per cent |
| A. Crude | 1-10000 | 1-1000 | 100 | | | 1-2000 | 100 | |
|  | 1-10000 | 1-2000 | 100 | | Lorol Rhodanate | 1-2000 | 100 | |
|  | 1-10000 | 1-4000 | 94 | | | 1-2000 | 100 | |
|  | 1-2000 | 1-1000 | | 76 | Rotenone (95%) | 1-1000 | 100 | |
| B. Distilled | 1-10000 | 1-1000 | 100 | | | 1-2000 | 100 | |
|  | 1-10000 | 1-2000 | 100 | | Lorol Rhodanate | 1-2000 | 100 | |
|  | 1-10000 | 1-4000 | 89 | | | 1-2000 | 100 | |
|  | 1-2000 | 1-1000 | | 71 | Rotenone (95%) | 1-1000 | 100 | |
| Ether adduct of 2'-hydroxy-2,4,4,7,4'-pentamethylflavan. Condensate of acetone and crude mixture of m- and p-cresols): | 1-5000 | 1-500 | 100 | 59 | Lorol Rhodanate | 1-2000 | 59 | 99 |
| A. Crude | 1-10000 | 1-1000 | 98 | | | 1-2000 | 100 | |
|  | 1-10000 | 1-2000 | 64 | | Do | 1-2000 | 100 | |
|  | 1-10000 | 1-4000 | 22 | | | 1-2000 | 100 | |
|  | 1-2000 | 1-1000 | | 43 | Rotenone (95%) | 1-1000 | | 100 |
| B. Distilled | 1-2500 | 1-250 | 99 | 56 | | 1-2000 | 59 | 99 |
|  | 1-5000 | 1-500 | 91 | 50 | Lorol Rhodanate | 1-2000 | 59 | 99 |
|  | 1-10000 | 1-1000 | 75 | 35 |  | 1-2000 | 59 | 99 |
|  | 1-20000 | 1-2000 | 64 | 32 |  | 1-2000 | 59 | 99 |
| Condensate of diacetone alcohol and m-cresol | 1-2500 | 1-250 | 98 | | Do | 1-2000 | 59 | |
|  | 1-5000 | 1-500 | 79 | | | 1-2000 | 59 | |
| 2'-hydroxy-2,4,4,6,5'-pentamethylflavan (p-cresol-acetone) | 1-2500 | 1-250 | 87 | | Do | 1-2000 | 59 | |
|  | 1-5000 | 1-500 | 64 | | | 1-2000 | 59 | |

The compounds responding to the invention are particularly useful as insecticides for the control of chewing insects such as Mexican bean beetle and in some instances for the control of soft-bodied insect pests such as red spiders. They show a high degree of specificity, some instances, for example being effective against red spider while not so effective for the control of Aphis rumicis. They may safely be applied in relatively high concentrations to various types of foliage without injury and may be taken internally in relatively high concentrations by warm-blooded animals.

They may be used in various combinations with such auxiliary materials as spreaders, stickers, and other toxicants; for example, insecticides such as metallic arsenates, fluosilicates, phenothiazines, organic thiocyanates such as n-dodecyl thiocyanate, fenchyl thiocyanoacetate and butyl carbitol thiocyanate, nicotine, anabasine (neonicotine), nor-nicotine, rotenone and its congeners, hellebore, pyrethrum, N-isobutylundecylenamide, aminomethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophyllite, talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures with insecticides and fungicides and insecticidal and fungicidal adjuvants as are here set out may have particular usefulness in special applications and frequently will give better results than would be anticipated from the killing power or repellent action of each ingredient when used alone.

In general the active agents of this invention may be formulated in a wide variety of ways as may be best suited to the control of any particular pest or combination of pests, having in mind the nature of the pest, its particular habitat and feeding habits, and its peculiar susceptibilities, if any. Thus suitable compositions may be prepared with the active agent in a state of composition, subdivision, and association with other materials such as have been mentioned, such as may be necessary peculiarly to adapt the active agent to the purpose to be effected.

The term "condensate" as used herein and in the appended claims is intended to include the condensation product and derivatives obtainable by replacing hydrogen.

I claim:

1. The method of insect control which comprises contacting the insect with a bi-molecular condensate obtained by condensing two mols of a keto-enol and two mols of a phenol having a replaceable ortho hydrogen with the splitting off of two mols of water.

2. The method of insect control which comprises contacting the insect with a bi-molecular condensate obtained by condensing two mols of acetone and two mols of a phenol having a replaceable ortho hydrogen with the splitting off of two mols of water.

3. The method of controlling insects infesting foliage which comprises contacting the insect while infesting the foliage with a bi-molecular condensate obtained by condensing two mols of a keto-enol and two mols of a phenol having a replaceable ortho hydrogen with the splitting off of two mols of water.

4. The method of controlling insects infesting foliage which comprises contacting the insect while infesting the foliage with a bi-molecular condensate obtained by condensing two mols of acetone and two mols of a phenol having a replaceable ortho hydrogen with the splitting off of two moles of water.

5. An insecticidal composition consisting essentially in a physical dispersion of a toxicant on a finely divided inert having a particle size less than 40 microns containing as an essential active ingredient of said toxicant a bi-molecular condensate obtained by condensing two mols of a keto-enol and two mols of a phenol having a replaceable ortho hydrogen with the splitting off of two mols of water.

6. An insecticidal composition consisting essentially in a physical dispersion of a toxicant on a finely divided inert having a particle size less than 40 microns containing as an essential active ingredient of said toxicant a bi-molecular condensate obtained by condensing two mols of a keto-enol and two mols of m-methoxyphenol with the splitting off of two mols of water.

7. An insecticidal composition consisting essentially in a physical dispersion of a toxicant on a finely divided inert having a particle size less than 40 microns containing as an essential active ingredient of said toxicant a bi-molecular condensate obtained by condensing two mols of a keto-enol and two mols of phenol with the splitting off of two mols of water.

8. An insecticidal composition consisting essentially in a physical dispersion of a toxicant on a finely divided inert having a particle size less than 40 microns containing as an essential active ingredient of said toxicant a bi-molecular condensate obtained by condensing two mols of a keto-enol and two mols of p-cresol with the splitting off of two mols of water.

9. The method of controlling insects which comprises contacting the insect with a bi-molecular condensate obtained by condensing two mols of a keto-enol and two mols of meta-methoxyphenol with the splitting off of two mols of water.

10. The method of controlling insects which comprises contacting the insect with a bi-molecular condensate obtained by condensing two mols of a keto-enol and two mols of phenol with the splitting off of two mols of water.

11. The method of controlling insects which comprises contacting the insect with a bi-molecular condensate obtained by condensing two mols of a keto-enol and two mols of para-cresol with the splitting off of two mols of water.

12. An insecticidal composition comprising a toxicant in admixture with an insecticidal adjuvant selected from the group consisting of a finely divided solid having a particle size less than 40 microns, a hydrocarbon solvent, and a wetting agent, said toxicant containing as an essential active ingredient a bi-molecular condensate obtained by condensing 2 moles of a keto-enol and 2 moles of a phenol having replaceable o-hydrogen with the splitting off of 2 moles of water.

13. An insecticidal composition comprising a toxicant in admixture with an insecticidal adjuvant selected from the group consisting of a finely divided solid having a particle size less than 40 microns, a hydrocarbon solvent, and a wetting agent, said toxicant containing as an essential active ingredient a bi-molecular condensate obtained by condensing 2 moles of a keto-enol and 2 moles of m-methoxyphenol with the splitting off of 2 moles of water.

14. An insecticidal composition comprising a toxicant in admixture with an insecticidal adjuvant selected from the group consisting of a finely divided solid having a particle size less than 40 microns, a hydrocarbon solvent, and a wetting agent, said toxicant containing as an essential active ingredient a bi-molecular condensate obtained by condensing 2 moles of a keto-enol and 2 moles of phenol with the splitting off of 2 moles of water.

15. An insecticidal composition comprising a toxicant in admixture with an insecticidal adjuvant selected from the group consisting of a finely divided solid having a particle size less than 40 microns, a hydrocarbon solvent, and a wetting agent, said toxicant containing as an essential active ingredient a bi-molecular condensate obtained by condensing 2 moles of a keto-enol and 2 moles of p-cresol with the splitting off of 2 moles of water.

16. An insecticidal composition comprising a toxicant in solution in a hydrocarbon solvent, said toxicant containing as an essential active ingredient a bi-molecular condensate obtained by condensing 2 moles of a keto-enol and 2 moles of a phenol having replaceable o-hydrogen with the splitting off of 2 moles of water.

17. An insecticidal composition comprising an aqueous emulsion containing as an essential active ingredient a bi-molecular condensate obtained by condensing 2 moles of a keto-enol and 2 moles of a phenol having replaceable o-hydrogen with the splitting off of 2 moles of water.

EUCLID W. BOUSQUET.